(12) United States Patent
Rzadki et al.

(10) Patent No.: US 7,341,496 B2
(45) Date of Patent: Mar. 11, 2008

(54) FAST SEA-GOING SHIP WITH A DOUBLE BOTTOM AND A WATERJET DRIVE

(75) Inventors: Wolfgang Rzadki, Glinde (DE);
 Karl-Otto Sadler, Hamburg (DE);
 Matthias Schulze, Lüneburg (DE);
 Bernd Wacker, Herzogenaurach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/516,225

(22) PCT Filed: Apr. 4, 2003

(86) PCT No.: PCT/DE03/01120

§ 371 (c)(1),
(2), (4) Date: Jul. 21, 2005

(87) PCT Pub. No.: WO03/101829

PCT Pub. Date: Dec. 11, 2003

(65) Prior Publication Data

US 2006/0141876 A1 Jun. 29, 2006

(30) Foreign Application Priority Data

May 29, 2002 (DE) .............................. 102 24 013

(51) Int. Cl.
 *B63H 11/08* (2006.01)
 *B63H 11/117* (2006.01)
(52) U.S. Cl. ......................................... 440/38; 440/43
(58) Field of Classification Search ............... 440/38, 440/40, 41, 42, 43, 51
 See application file for complete search history.

(56) References Cited

U.S. PATENT DOCUMENTS

| | | | | |
|---|---|---|---|---|
| 778,435 | A | * 12/1904 | Atwood | 440/51 |
| 3,209,717 | A | 10/1965 | Campell et al. | |
| 3,463,115 | A | * 8/1969 | French | 440/3 |
| 3,943,876 | A | * 3/1976 | Kiekhaefer | 440/43 |
| 4,274,357 | A | 6/1981 | Dawson | |
| 5,045,002 | A | 9/1991 | Törneman et al. | |
| 5,265,549 | A | 11/1993 | Cernier | |
| 6,238,257 | B1 | * 5/2001 | Platzer et al. | 440/42 |
| 6,489,701 | B1 | * 12/2002 | Gamble et al. | 310/179 |
| 2001/0039155 | A1 | 11/2001 | Ito et al. | |

FOREIGN PATENT DOCUMENTS

DE 32 34 370 A1 3/1984

OTHER PUBLICATIONS

Rolls-Royce, "Rolls-Roycle- the force in marine solutions", Internet pages of Rolls-Royce, pp. 1-36.
Otto Scherer, Ian Mutnick and Frank Lanni, "Procedure for Conducting a Towing Tank Test of a Waterjet Propelled Craft Using Laser Doppler Velocimetery to Determine the Momentum and Energy Flux", Presented at the 26th ATTC Webb Institute, Jul. 23-24, 2001, pp. 1-32.

* cited by examiner

*Primary Examiner*—Sherman Basinger

(57) ABSTRACT

The invention relates to a high-speed, sea-going ship comprising a double hull and a water-jet drive, the latter consisting of at least one pump assembly for generating the water-jet and at least one drive motor for the pump assembly. According to the invention, the pump assembly and its drive motor are located outside the stern area of the ship by using, in part, the space in the double hull.

26 Claims, 3 Drawing Sheets

FAST SEA-GOING SHIP WITH A DOUBLE BOTTOM AND A WATERJET DRIVE

CROSS REFERENCE TO RELATED APPLICATIONS

This application is the US National Stage of International Application No. PCT/DE03/01120, filed Apr. 4, 2003 and claims the benefit thereof. The International Application claims the benefits of German application No. 10224013.2 filed May 29, 2002, both of the applications are incorporated by reference herein in their entirety.

FIELD OF INVENTION

The invention relates to a fast sea-going ship with a double bottom which features a waterjet drive comprising at least one pump assembly for generating the water jet and at least one drive motor for the pump assembly.

SUMMARY OF INVENTION

The object of the invention is to provide a fast sea-going ship, e.g. a frigate or a destroyer, but also a ferry or a megayacht, with a drive system which offers significant advantages over the known drive systems. The main advantage is to be the avoidance of the exhaust plume. In addition the invention is designed to reduce the space required for the drive. The intention is also, in conjunction with a propeller drive, to provide redundancy which for example will allow warships to keep going after sustaining a heavy hit.

These objects are achieved by locating the pump assembly and its drive motor outside the stern area of the ship, partly using the space in the double bottom.

The new arrangement in accordance with the invention makes it advantageously possible without any great outlay to direct exhaust gases underneath the ship, so that these dissipate in the water. Using a part of the double bottom produces a low-profile layout for the waterjet and its drive motor while still obtaining a good waterjet exit angle.

Waterjets for driving fast sea-going ships are known from the latest Internet pages of Rolls-Royce under the title "Rolls-Royce-the force in marine solutions".

Here the individual components of the drive system are located in the stern section of the ship, as is also known from speedboats with waterjets and has long been normal in large shipbuilding for propeller drives. For reasons of effectiveness the waterjets are essentially located so that the jet is freely emitted, i.e. over water. This type of arrangement is however not suitable for achieving the objects in accordance with the invention.

There is a provision in the embodiment of the invention for the pump assembly and its drive motor to be located in the rear area of the middle of the ship. Locating the system rear amidships means that the water jet is able to contribute to the distribution of the exhaust gas in the water. Of particular advantage is the breakup and fine distribution of the exhaust gas bubbles when the ship is traveling fast. Because of the deep introduction into the water they do not rise to the surface until they are well behind the stern of the ship. Here they rise up into the ship's wake.

In a further embodiment of the invention there is provision for the drive motor for the pump assembly to be an electric motor, with this electric motor especially featuring partly HTSL windings. Usually the pump assemblies of waterjets will be driven directly by diesel engines or gas turbines. This would be possible in the midships area of any large ship. It is however of particular advantage for the ability to control and accommodate the waterjet if the drive is an electric motor.

In a further major embodiment of the invention there is provision for the drive motor for the pump assembly to feature an armature with HTSL windings. An armature of the electric motor with HTSL windings allows a particularly small design of motor. In this case a large air gap between armature and stator windings is possible. This provides favorable conditions for a shockproof embodiment of the motor which is very advantageous for warships. In addition the efficiency of the motor compared to conventional electric motors is increased and the very advantageous option of arranging the electric motor within the double hull bottom of the ship is also provided. This in its turn leads to a short shaft between the electric motor and the pump assembly which is essentially arranged outside the double bottom of the ship. Overall this produces a waterjet and drive arrangement which is smaller and lighter than conventional versions by an order of magnitude. The technical difficulties which would be produced by having a long shaft are avoided, as is the large space requirement, for example for a diesel direct drive of the waterjet.

In this case there is provision for the pump assembly to be arranged in a single-part or multipart nacelle, especially one which is partly integrated in the double bottom. This provides the option of an especially good flow around of the nacelle and entry of the water into the pump assembly. The inflow is especially important when an axial pump or diagonal/radial pump is used. The underwater silhouette of the ship is advantageously only slightly altered by this.

The waterjet, its nacelle and where necessary its drive motor are advantageously arranged in a special section of the ship which is embodied as a double bottom module and can be inserted during the building phase of the ship into the double bottom. This allows rational prefabrication to be undertaken and the difficulties and costs of retrofitting are avoided. These advantages are also obtained when the waterjets for cargo, or passenger ships, where the complete exhaust dissipation into the water is not so significant, are arranged in the stern area.

In a further embodiment of the invention there is provision for the pump assembly to be arranged under a raised part of the ship's lower bottom. In this case it is advantageous that by virtue of the small dimensions of the electric motor and its accommodation in the double bottom in the raised part that only flattening of the lower bottom is required. It is not necessary to make an indentation in the shape of the lower bottom.

There are preferably multiple pump assemblies for generating the water jets and these are grouped into pairs. This produces an especially favorable flow design of the small water jet housings which can be arranged entirely below the lower bottom or are partly incorporated into the lower bottom. This depends on the relevant size of the ship and the projected speed, on which the size of the waterjets depends.

The waterjets are advantageously inclined both horizontally and also under some circumstances vertically in relation to the longitudinal axis of the ship or the horizontal plane. The inclination is advantageously around 4 to 7 degrees, thus being very small. This produces especially favorable flow conditions under the hull which allow the waterjets and, in accordance with the invention, also electrical rudder propellers on the stern to be operated with a good level of efficiency. The ship can thus be driven with just the rudder propellers and also with just the waterjets and preferably with a combination of these two drive components.

This especially if the waterjets are pointed slightly outwards. The arrangement of the pump assemblies advantageously partly follows the slope of the hull of the ship. This makes for a particularly good distribution of the exhaust gases.

For advantageous introduction of the exhaust gases into the water there is provision in this case for each pump assembly on a water exit side to feature a coaxial exhaust nozzle segment (KADS) for mixing the ship's exhaust into the water jet. Thus it is possible to introduce the ship's exhaust into the flow underneath the ship without exhaust compressors having to be used. At the same time a good distribution of the exhaust in the water is ensured.

The drive motor of the pump assembly advantageously obtains its electrical energy from a gas turbine generator set which is especially accommodated in an energy generation module. This energy generation module can advantageously be well protected from shocks so that, together with an individual shock-protected positioning of the generators in the energy generation module, a high level of shock proofing is produced for the entire drive for warships. The waterjet drive can also be embodied to be very shockproof, since all bearings can be embodied with shock protection and the individual parts are made of high-impact materials.

In this case there is advantageous provision for the gas turbine generator set to be arranged above the pump assembly. This produces, in the aft part of the middle of the ship, low down and thereby well protected, an energy generation system for powering the ship which can be embodied to be highly stable. Of further advantage here is that it is possible for the gas turbine exhaust line to be of a short design to let it flow into the coaxial exhaust gas nozzle segment (KADS) on the waterjet exit side of the pump assembly. The exhaust gas pressure losses are thus minimized. The exhaust line itself can be fed into a vacuum area of the coaxial exhaust gas nozzle segment (KADS), so that there is no significant loss of power of the gas turbine.

In a further embodiment of the invention there is provision for the generator to feature HTSL windings, especially an armature with HTSL windings. This means that the generator to can provide a small design and shock protection levels not previously achieved.

Behind the waterjets jet deflection elements 19 are provided for the water jets, especially jet deflection elements retractable into the double bottom, such as swiveling plates. This allows the water jets to be steered which is adapted in a particular way to the spatial arrangement of the waterjets in the body of the ship. This simultaneously produces a favorable flow design for the case where the waterjets are not activated.

The waterjets are advantageously embodied for individual control—this is a simple option provided by using electrical drive motors—and the power regulation of the waterjets is coordinated with the regulation of the power of an additional propeller drive. Thus, at any time, even if the propeller drive fails, both the controllability of the ship—through individual regulation which can be undertaken for each side—and also the overall speed of the ship can be controlled. Overall this produces a survivability capability and a maneuverability capability for the ship not previously known in military shipbuilding and also in civil shipbuilding.

The ship embodied in accordance with the invention advantageously features a propeller drive as well as the waterjets, especially an electrical rudder propeller drive, with the electrical rudder propeller drive 20 preferably obtaining its electrical energy from fuel cells 21. This produces both for civil ships and for military ships the advantage of full freedom from emissions with fuel cell drive (low speeds) or the unnoticeable emissions for motor (gas turbine) waterjet drive (high speeds). The exhaust wakes and noises which were previously easy to detect (warships) or were annoying (civil ships) completely disappear.

The invention is explained in greater detail on the basis of drawings which show further details also important to the invention.

DETAILED DESCRIPTION OF INVENTION

Figure 1:
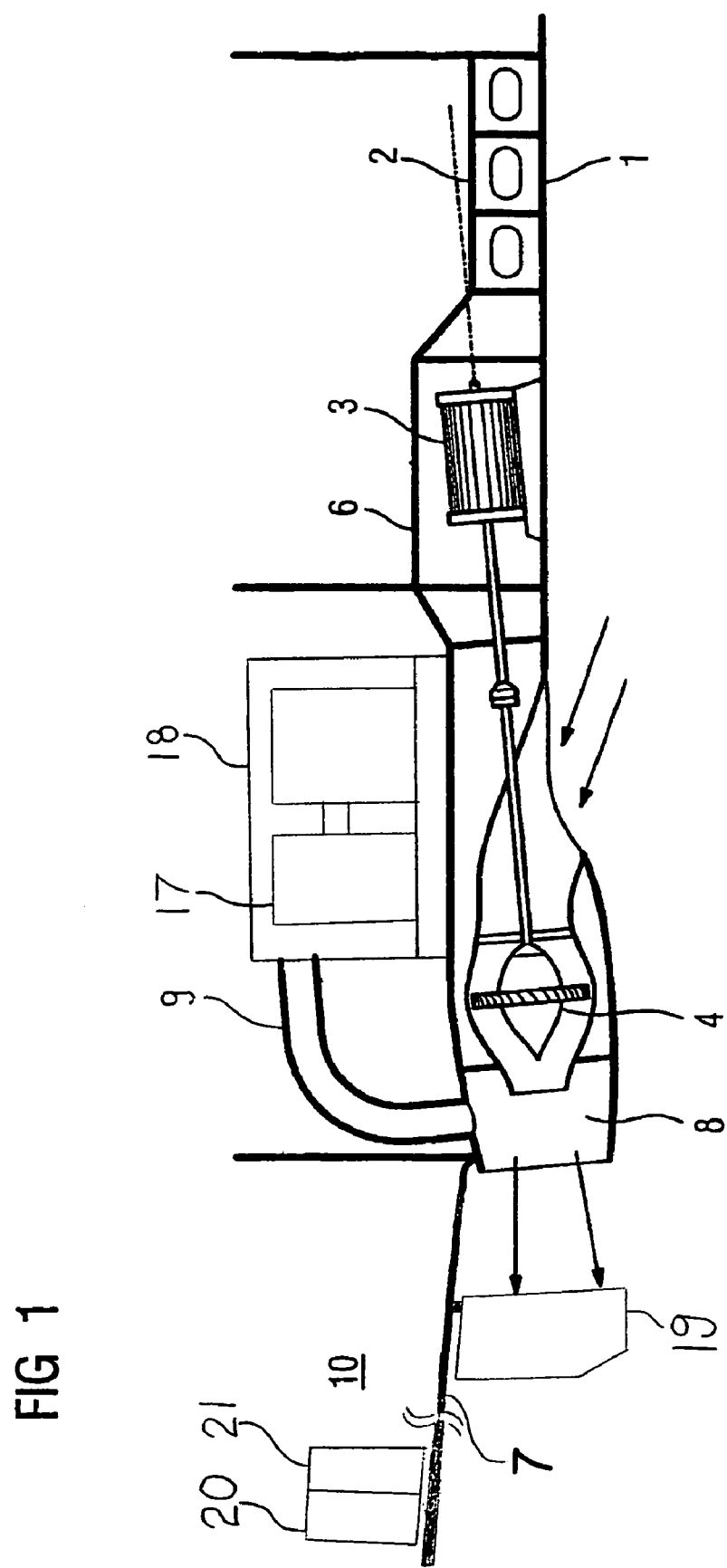
FIG. 1 a schematic diagram of the midships drive area (hull section)

In FIG. 1 the underside of the ship is numbered 1 and the top side of the double bottom 2. In the area 6 of the upper side of the double bottom angled slightly upwards is the drive motor 3 for the water jet generator assembly 4, preferably a motor with HTSL armature winding. The shaft between the components 3 and 4 can advantageously be of a very short design. The strength of the let in part 7 of the bottom of the ship is a function of the wavelength. A gas turbine generator set 17, in which the control and regulation devices are also advantageously located, is arranged in an energy generation module 18 over the drive unit of the ship. A coaxial exhaust nozzle segment (KARS) 8 into which the gas turbine exhaust line 9 feeds is appended to the water pump assembly 4. This is isolated in a particular way and features a closure flap.

In the hull an auxiliary machine room 10 adjoins the water pump assembly 4. The auxiliary machine room 10, the area of the water pump assembly 4 ship's bottom area in which the electric motor 3 is located, together form a bottom section which is advantageously installed when the ship is being built.

Figure 2:
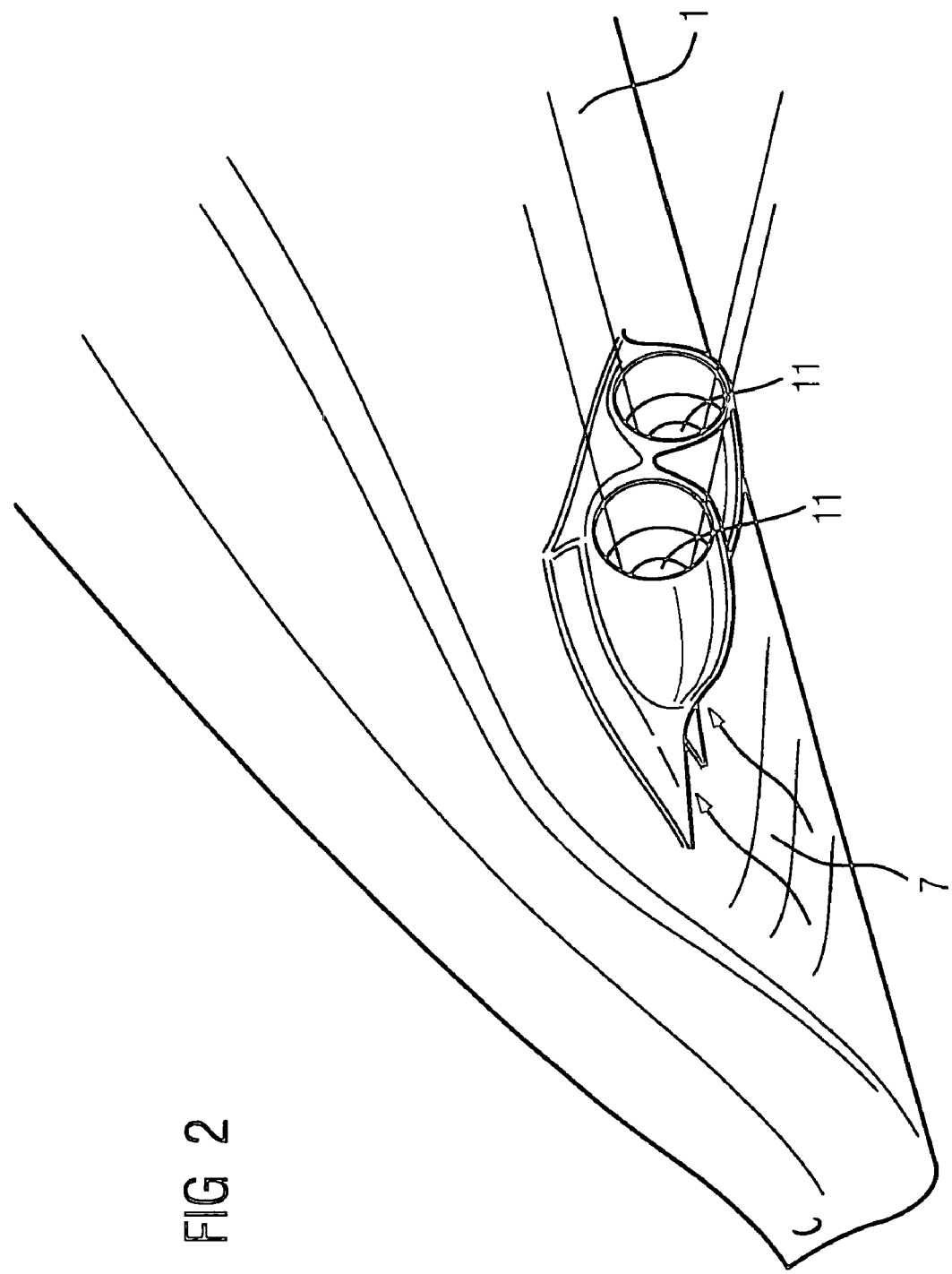
FIG. 2 a frame topology of the arrangement and the housing design of a pair of waterjets.

Further details of an option for accommodating the waterjets in pairs of nacelle are shown in the grid topology in FIG. 2 with the two nacelle 10 and 11. As can be seen from the grid topology it is possible, without significant interventions into the geometry of the bottom of the ship to obtain a good flow of water into the waterjets. These form only slight protrusions from the underwater cross section of the ship, so that only slight turbulence is produced. Overall the invention produces a good underwater shape for the ship even in the area of the waterjets.

Figure 3:
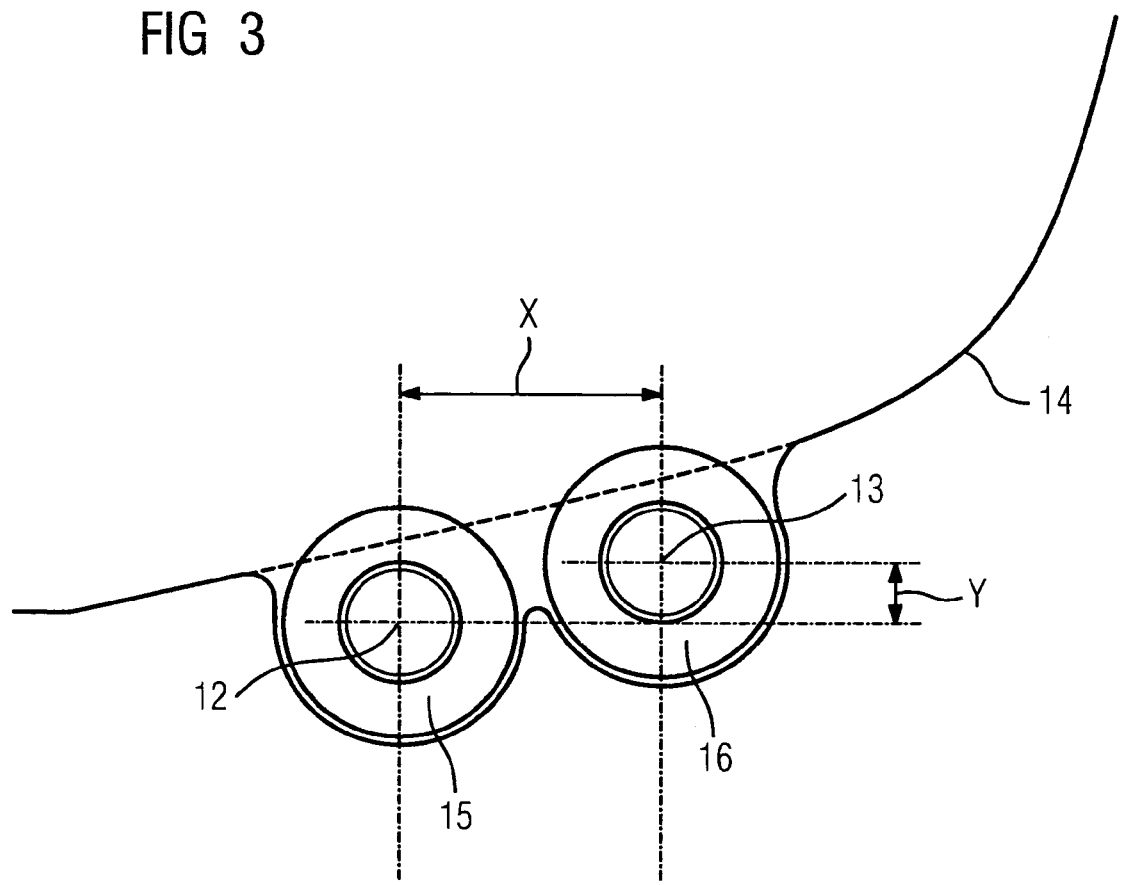
FIG. 3 a sketch taken from the vertical position of the waterjets.

In FIG. 3 the central axis of a first waterjet 15 is numbered 12 and the central axis of a second waterjet 16 is numbered 13, the two waterjets forming a pair. The horizontal gap between the waterjets 15, 16 is shown by X. Y designates the vertical gap between the waterjets 15, 16. The vertical gap Y is oriented to the slope or dead rise of the outside edge 14 in the area of the waterjets. Depending on the external centering of the waterjet arrangement and the slope or dead rise of the bottom of the ship, the size of X and Y determines what percentage of the exhaust gas flows backwards and what percentage rises up the sides of the ship.

The invention claimed is:

1. A fast sea-going ship with a hull comprising single side walls and double bottom walls having an upper bottom and an under bottom, comprising:
- a water jet drive having at least one pump assembly for generating a water jet and having at least one drive motor for driving the pump assembly, wherein
- the pump assembly and the drive motor are located outside a stern area of the ship between the upper and under bottom of the double bottom of the ship,
- wherein the drive motor for the pump assembly is an electric motor having at least in part HTSL windings, and
- wherein each pump assembly having a coaxial exhaust gas segment on its water outlet side for discharging the ship's exhaust gases into the water jet.

2. The ship in accordance with claim 1, wherein the electric motor comprises an armature with HTSL windings.

3. The ship in accordance with claim 1, wherein the pump assembly is located in a single-part or multipart nacelle partly integrated into the double bottom, wherein the pump and the HTSL drive motor are connected via a drive shaft.

4. The ship in accordance with claim 1, wherein the pump assembly is located under a raised part of the ship's hull, wherein the pump and the HTSL drive motor are connected via a short drive shaft.

5. The ship in accordance with claim 1, wherein the water jet drive and a nacelle and the drive motor are arranged in a hull section of the ship.

6. The ship in accordance with claim 5, wherein the upper and under bottoms of the ship are a double bottom module which can be inserted when the ship is being built.

7. The ship in accordance with claim 5, wherein the hull section is located amidships or in the aft section of the ship.

8. The ship in accordance with claim 1, comprising a plurality of pump assemblies.

9. The ship in accordance with claim 7, comprising two or four pump assemblies arranged in pairs next to one another.

10. The ship in accordance with claim 9, wherein each pair of pump assemblies as regards its vertical position, is adapted entirely or partly to the slope of the ship's hull.

11. The ship in accordance with claim 1, wherein the pump assembly or a pair of pump assemblies is arranged inclined at an angle to the horizontal direction.

12. The ship in accordance with claim 9, wherein the pump assembly or a pair of pump assemblies is arranged inclined at an angle to the horizontal direction such that the water jet is inclined downwards.

13. The ship in accordance with claim 12, wherein the water jet is inclined between 1 and 8 degrees relative to the horizontal direction.

14. The ship in accordance with claim 12, wherein the water jet is inclined between 4 and 7 degrees relative to the horizontal direction.

15. The ship in accordance with claim 1, wherein the pump assembly or a pair is positioned outwards relative to a longitudinal direction of the ship.

16. The ship in accordance with claim 1, wherein the drive motor of the pump assembly obtains its electrical energy from a gas turbine generator.

17. The ship in accordance with claim 16, wherein the gas turbine generator is accommodated in an energy generation module.

18. The ship in accordance with claim 16, wherein the gas turbine generator is located above the motor and pump assembly area.

19. The ship in accordance with claim 16, wherein the gas turbine comprises a short exhaust line discharging into a coaxial exhaust nozzle segment.

20. The ship in accordance with claim 16, wherein the generator has HTSL windings.

21. The ship in accordance with claim 1, further comprising jet deflection elements for the water jets.

22. The ship in accordance with claim 1, wherein the water jets are controlled individually.

23. The ship in accordance with claim 1, further comprising a rudder propeller drive.

24. The ship in accordance with claim 23, wherein the rudder propeller drive is an electrical rudder propeller drive obtaining its electrical energy from fuel cells.

25. The ship in accordance with claim 1, wherein the control of the power of the water jets is matched to the control of the power of a propeller drive of the ship.

26. The ship in accordance with claim 1, wherein the ship is a navy ship, a frigate, a corvette, a fast patrol boat, a cargo ship, a passenger ship, a ferry, a RoPax ship or a large yacht.

* * * * *